United States Patent
Fujita et al.

(10) Patent No.: US 6,733,563 B2
(45) Date of Patent: May 11, 2004

(54) METHODS FOR MANUFACTURING HYDROGEN STORAGE TANKS

(75) Inventors: Katsuyoshi Fujita, Kariya (JP); Hideki Morino, Kariya (JP); Hidehito Kubo, Kariya (JP); Keiji Toh, Kariya (JP); Hiroyuki Mitsui, Aichi (JP); Shinichi Towata, Aichi (JP); Kazuhiko Itoh, Aichi (JP); Makoto Ishikura, Toyota (JP)

(73) Assignees: Kabushiki Kaisha Toyota Jidoshokki, Kariya (JP); Toyota Jidosha Kabushiki Kaisha, Toyota (JP)

( * ) Notice: Subject to any disclaimer, the term of this patent is extended or adjusted under 35 U.S.C. 154(b) by 17 days.

(21) Appl. No.: 09/977,859

(22) Filed: Oct. 15, 2001

(65) Prior Publication Data

US 2002/0056715 A1 May 16, 2002

(30) Foreign Application Priority Data

Oct. 16, 2000 (JP) ........................ 2000-315658

(51) Int. Cl.⁷ ................................. B22F 9/04
(52) U.S. Cl. ..................... 75/352; 75/360; 420/900; 241/1; 241/30
(58) Field of Search ............... 75/352, 360; 419/33; 241/1, 30; 420/900

(56) References Cited

U.S. PATENT DOCUMENTS

| | | | | |
|---|---|---|---|---|
| 4,576,640 A | * | 3/1986 | Wootton et al. ............ | 420/900 |
| 4,839,085 A | * | 6/1989 | Sandrock et al. ........... | 420/900 |
| 4,893,756 A | * | 1/1990 | Fetcenko et al. ............... | 241/1 |
| 4,925,486 A | * | 5/1990 | Leland ......................... | 75/360 |
| 6,247,660 B1 | * | 6/2001 | Imai et al. .................... | 241/30 |

FOREIGN PATENT DOCUMENTS

JP  7-157813  6/1995  ............. B22F/9/04

* cited by examiner

Primary Examiner—George Wyszomierski
(74) Attorney, Agent, or Firm—Morgan & Finnegan, LLP

(57) ABSTRACT

Methods for making hydrogen storage tanks may include disposing a substantially solid block of hydrogen-absorbing alloy within an activation vessel. Hydrogen gas may then be introduced into the activation vessel under conditions that will cause the hydrogen-absorbing alloy to absorb hydrogen and crack or break apart. Preferably, a substantially powdered hydrogen-absorbing alloy is formed thereby. Thereafter, the substantially powdered hydrogen-absorbing alloy can be transferred from the activation vessel to a hydrogen storage tank without substantially exposing the powered hydrogen-absorbing alloy to oxygen. The hydrogen-absorbing alloy is preferably ingot-shaped when introduced into the activation vessel. Further, the substantially powdered hydrogen-absorbing alloy is preferably produced by continuously breaking the ingot-shaped hydrogen-absorbing alloy within the activation vessel due to volume expansion caused by the hydrogen-absorbing alloy having absorbed hydrogen. The hydrogen gas preferably contacts the hydrogen-absorbing alloy under relatively high-pressure and low temperature conditions.

17 Claims, 6 Drawing Sheets

METHODS FOR MANUFACTURING HYDROGEN STORAGE TANKS

BACKGROUND OF THE INVENTION

1. Field of the Invention

The present invention relates to methods for manufacturing hydrogen storage tanks and techniques for storing hydrogen within the hydrogen storage tank.

2. Description of the Related Art

Hydrogen is becoming more popular as an alternative fuel source and vehicles that utilize fuel cells as a source of power, instead of a combustion engine, have been proposed. Such fuel cells can efficiently generate energy by oxidizing hydrogen. Therefore, techniques have been proposed for effectively storing hydrogen using a hydrogen-absorbing alloy.

Known hydrogen-absorbing alloys absorb hydrogen when exposed to hydrogen under certain pressure and temperature conditions. By heating the hydrogen-absorbing alloy, hydrogen may then be released. Thus, in order to efficiently utilize a hydrogen-absorbing alloy to store hydrogen, the hydrogen-absorbing alloy must be activated to appropriately absorb and release hydrogen.

Pulverization has been described as one method for activating the hydrogen-absorbing alloy. By breaking up and pulverizing the hydrogen-absorbing alloy, a powdered hydrogen-absorbing alloy can be obtained. For example, Japanese Laid-open Patent Publication No. 7-157813 describes a technique of disposing a hydrogen-absorbing alloy within a vessel that is maintained in a vacuum or a hydrogen atmosphere. Then, shape memory alloy chips are disposed within or inserted into the hydrogen-absorbing alloy, thereby deforming the shape memory alloy chips. Due to the elastic restoring force of the shape memory alloy chips, the hydrogen-absorbing alloy will be broken up and pulverized by the shape memory alloy chips returning to their original shape.

However, when the hydrogen-absorbing alloy absorbs hydrogen, the hydrogen-absorbing alloy expands and the volume of the hydrogen absorbing alloy will increase. Therefore, the volume expansion ratio of the hydrogen-absorbing alloy during hydrogen absorption must be accurately calculated in advance in order to accurately determine the total amount of the hydrogen-absorbing alloy that will be filled within a hydrogen storage tank. Otherwise, excessively high stress will be exerted onto the hydrogen storage tank body due to the expansion of hydrogen-absorbing alloy that has absorbed hydrogen.

SUMMARY OF THE INVENTION

It is, therefore, an object of the present teachings to provide improved techniques for storing hydrogen.

In one representative method according to the present teachings, a hydrogen storage tank may be manufactured with a powdered hydrogen-absorbing alloy disposed therein. For example, an activation vessel first may be filled with a hydrogen-absorbing alloy. The alloy is preferably in a substantially solid block or ingot form. Then, hydrogen gas may be introduced into the activation vessel. The absorption of hydrogen gas preferably causes the hydrogen-absorbing alloy to pulverize and become substantially powdered. In other words, the hydrogen-absorbing alloy can be activated by absorbing hydrogen within the activation vessel. In a preferred embodiment of the present teachings, "activation" may be defined by a process that enables the hydrogen-absorbing alloy to sufficiently absorb and store hydrogen. The term "substantially powdered" is intended to encompass not only powders having a uniform diameter, but also a small pieces or chips of the hydrogen-absorbing alloy.

After activating the hydrogen-absorbing alloy in the activation vessel, a hydrogen storage tank can be prepared. For example, a vacuum may be applied to the hydrogen storage tank in order to substantially evacuate the interior of the hydrogen storage tank. In addition or in the alternative, a substantially inert gas may be introduced into the hydrogen storage tank. Thereafter, the interior of the hydrogen storage tank is placed in communication with (e.g., connected to) the activation vessel and the powdered hydrogen-absorbing alloy is transferred from the activation vessel to the hydrogen storage tank. According to the present teachings, accurate calculation of the volume expansion ratio of the hydrogen-absorbing alloy during the activation process and during the absorption of the hydrogen is not necessary, because the hydrogen-absorbing alloy has already expanded by absorbing hydrogen before being introduced into the hydrogen storage tank.

Other objects, features and advantage of the present invention will be readily understood after reading the following detailed description together with the accompanying drawings and the claims.

DETAILED DESCRIPTION OF THE INVENTION

Figure 1:
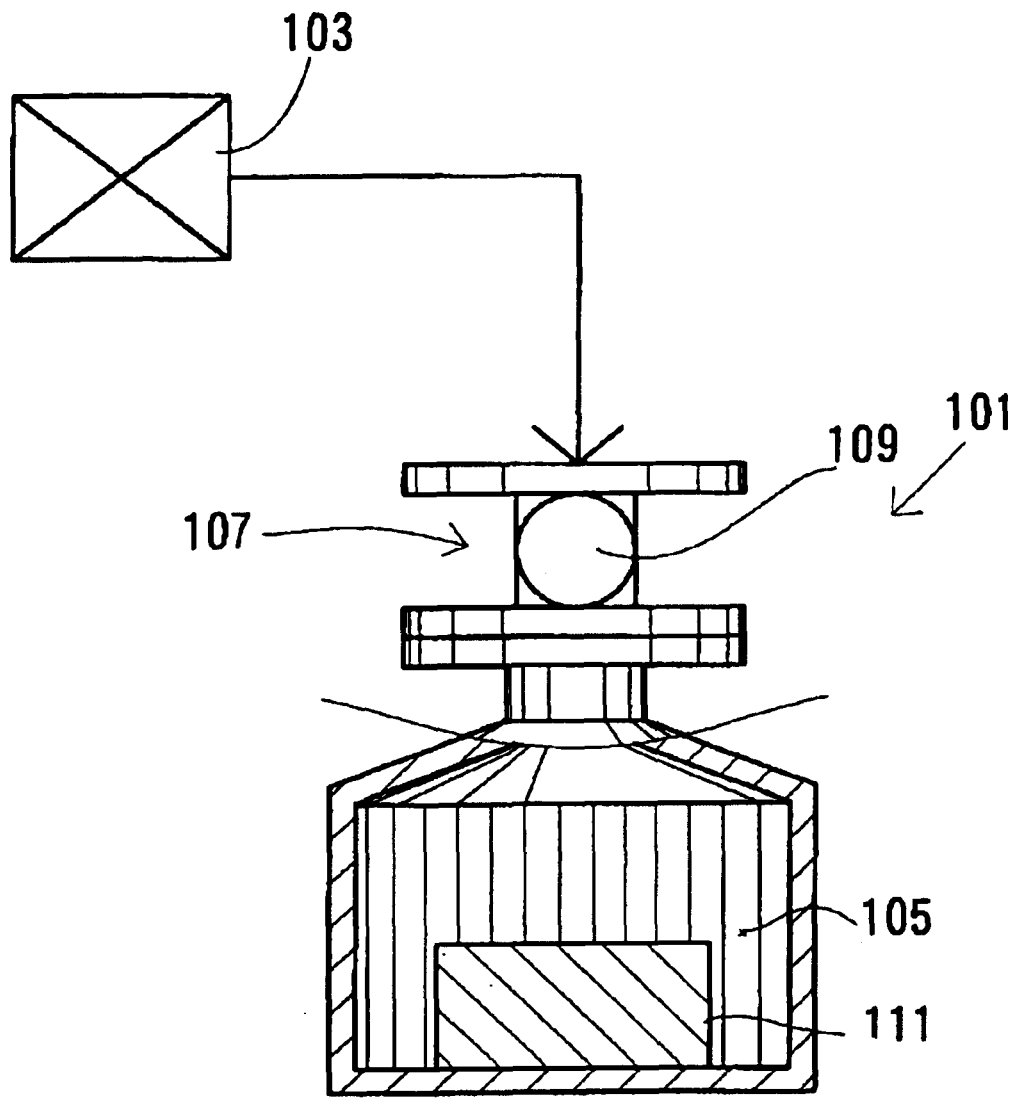
FIG. 1 is a cross-sectional view showing a high-pressure activation vessel into which hydrogen is supplied.

In another embodiment of the present teachings, an ingot-shaped hydrogen-absorbing alloy may preferably be disposed within the activation vessel for activation. Herein, the term "ingot" is intended to mean a mass of metal that has been formed or cast into a convenient shape for storage or transportation to be later processed. Then, hydrogen gas is introduced into the activation vessel under appropriate temperature and pressure conditions. As a result, the ingot-shaped hydrogen-absorbing alloy will continuously crack and break up due to volume expansion caused by hydrogen absorption. For example, the inner surfaces (including newly generated surfaces that appear due to the cracks in the surface) are exposed to the hydrogen gas and as each surface absorbs hydrogen, it will expand and break off from the ingot.

As newly emerging surfaces of the hydrogen-absorbing alloy absorb hydrogen and expand, addition cracks and fissures will form in the ingot-shaped hydrogen absorbing alloy until the hydrogen absorbing alloy is substantially pulverized. As the result, a substantially powdered hydrogen-absorption alloy can be obtained from this technique. The term "continuously" may mean continuous cracking or breaking over time or repeated emerging and cracking of each fresh surface of the ingot-shaped hydrogen-absorbing alloy. Because a substantially powdered hydrogen absorption alloy can be obtained simply by introducing hydrogen to the ingot-shaped hydrogen-absorbing alloy, no special procedures are required or necessary to make the powdered hydrogen-absorbing alloy. Further, by utilizing the ingot-shaped alloy, the surface area that may be exposed to oxygen in the air during the hydrogen-absorbing alloy activation process can be minimized.

Preferably, the hydrogen storage tank may communicate with or may be connected to the activation vessel by a valve. The valve may be disposed on either the activation vessel or the hydrogen storage tank. The hydrogen storage tank may preferably be in a vacuum state or may be filled with an inert gas, such as argon. As a result, the hydrogen-absorbing alloy may be prevented from being exposed to oxygen in the air and thus, may be prevented from oxidizing. Preferably, the valve may include a ball valve in order to provide a tight seal.

Each of the additional features and method steps disclosed above and below may be utilized separately or in conjunction with other features and method steps to provide improved techniques for manufacturing hydrogen storage tanks and methods for effectively storing hydrogen by utilizing hydrogen-absorbing alloys. Representative examples of the present invention, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will now be given with reference to the accompanying drawings.

A representative method for manufacturing a hydrogen storage tank is shown in FIGS. 1 to 5. Such hydrogen storage tanks may be preferably utilized within a fuel cell system for a vehicle. Naturally, the hydrogen storage tanks prepared according to the present teachings also may be utilized in a variety of other ways. In the following description of the representative embodiments, the hydrogen-absorbing alloy will be referred to as "MH," in which "M" is intended to indicate a metal and "H" is intended to indicate hydrogen.

A representative activation vessel 101 is shown in FIG. 1 and may also be referred to as a "reserve tank." As shown in FIG. 1, the activation vessel 101 preferably includes an interior 105, a connecting portion 107 and a ball valve 109. The interior 105 of the activation vessel 101 may communicate with a hydrogen supply source 103 via the connecting portion 107 when the ball valve 109 is opened.

FIG. 1 also shows MH ingot 111 disposed within the interior 105 of the activation vessel 101. MH ingot 111 is preferably a substantially solid block of hydrogen-absorbing alloy. In one embodiment of the present teachings, MH ingot 111 within the interior 105 may be first cooled and then the activation vessel 101 may be connected to the hydrogen supply source 103 via the connecting portion 109. When the ball valve 109 is opened, hydrogen gas is introduced into the activation vessel 101. In a representative, but not limiting, embodiment of the present teachings, MH ingot 111 preferably comprises titanium and vanadium and has a body centered cubic (BCC) structure.

The hydrogen-absorbing (hydrogen-storing) capacity of the hydrogen-absorbing alloy is influenced by local temperature and pressure conditions. Under relatively high pressure and low temperature conditions, MH ingot 111 will absorb hydrogen. Thus, in this representative embodiment, after MH ingot 111 within the interior 105 has been cooled, MH ingot 111 may quickly absorb hydrogen. In another representative, but not limiting, embodiment of the present teachings, the hydrogen is supplied to the interior 105 of the activation vessel 101 at a pressure of about 0.5–10 MPa and a temperature of about 20–60° C.

Figure 2:
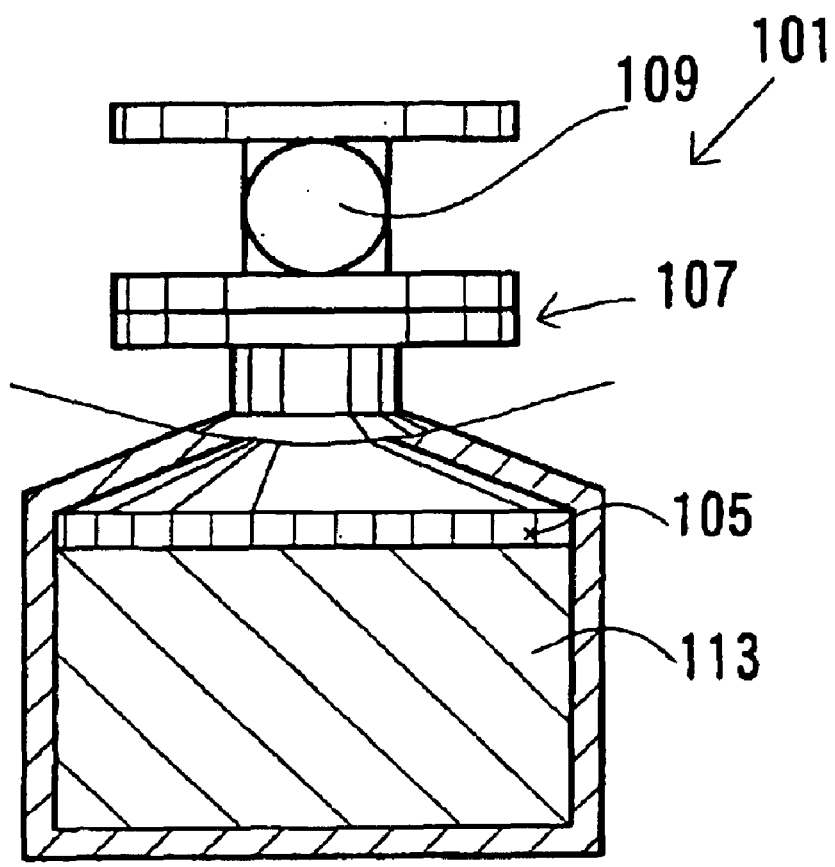
FIG. 2 is a cross-sectional view showing MH powder generated within the high pressure activation vessel.

As MH ingot 111 absorbs hydrogen, MH ingot 111 will begin to crack and break up, because the hydrogen-absorbing alloy expands due to hydrogen absorption. Thus, as shown in FIG. 2, a substantially powdered hydrogen-absorbing alloy, i.e., MH powder 113, can be produced within the activation vessel 101. Preferably, MH ingot 111 is cracked and broken up into particles having a size on the order of tens of microns.

More specifically, during activation of MH ingot 111, the surface of MH ingot 111 will crack due to the volume expansion of the surface portions of MH ingot 111 that has absorbed hydrogen. As portions of MH ingot 111 crack, the interior of MH ingot 111 will be newly exposed to the outer surface of MH ingot 111. Then, the newly exposed surfaces of MH ingot 111 will also absorb hydrogen within the activation vessel 101, and thereby expand and further crack or break. In this way, MH ingot 111 will be continuously cracked and pulverized and change into a substantially powdered state due to the volume expansion caused by hydrogen absorption. As the result, MH powder 113 can be produced within the activation vessel 101 and thus, the activation of MH ingot 111 is completed.

As shown in FIG. 2, if the ball valve 109 is closed, the MH powder 113 inside the interior 105 will not communicate with the outside. Therefore, MH ingot 111 and MH powder 113 can be prevented from being exposed to oxygen in the air during the activation process and thus, can be prevented from oxidizing.

Figure 3:
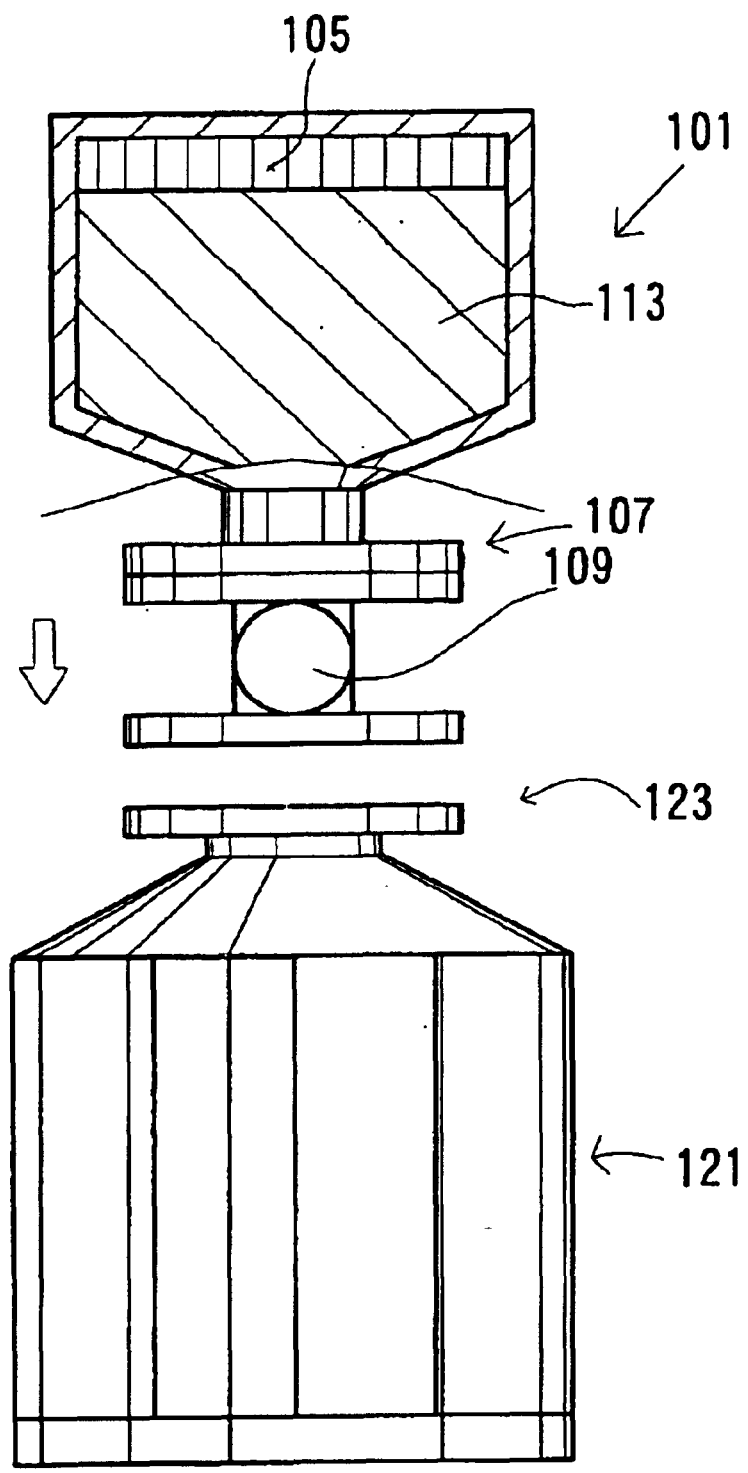
FIG. 3 is a cross-sectional view showing a MH tank being connected to the activation vessel.

As shown in FIG. 3, the activation vessel 101 can then be inverted and connected to a hydrogen storage tank 121. Therefore, the connecting portion 107 of the activation vessel 101 will communicate with a connecting portion 123 on the hydrogen storage tank 121 via the ball valve 109. Preferably, at this time, the ball valve 109 is closed and a vacuum is formed inside the hydrogen storage tank 121.

Figure 4:
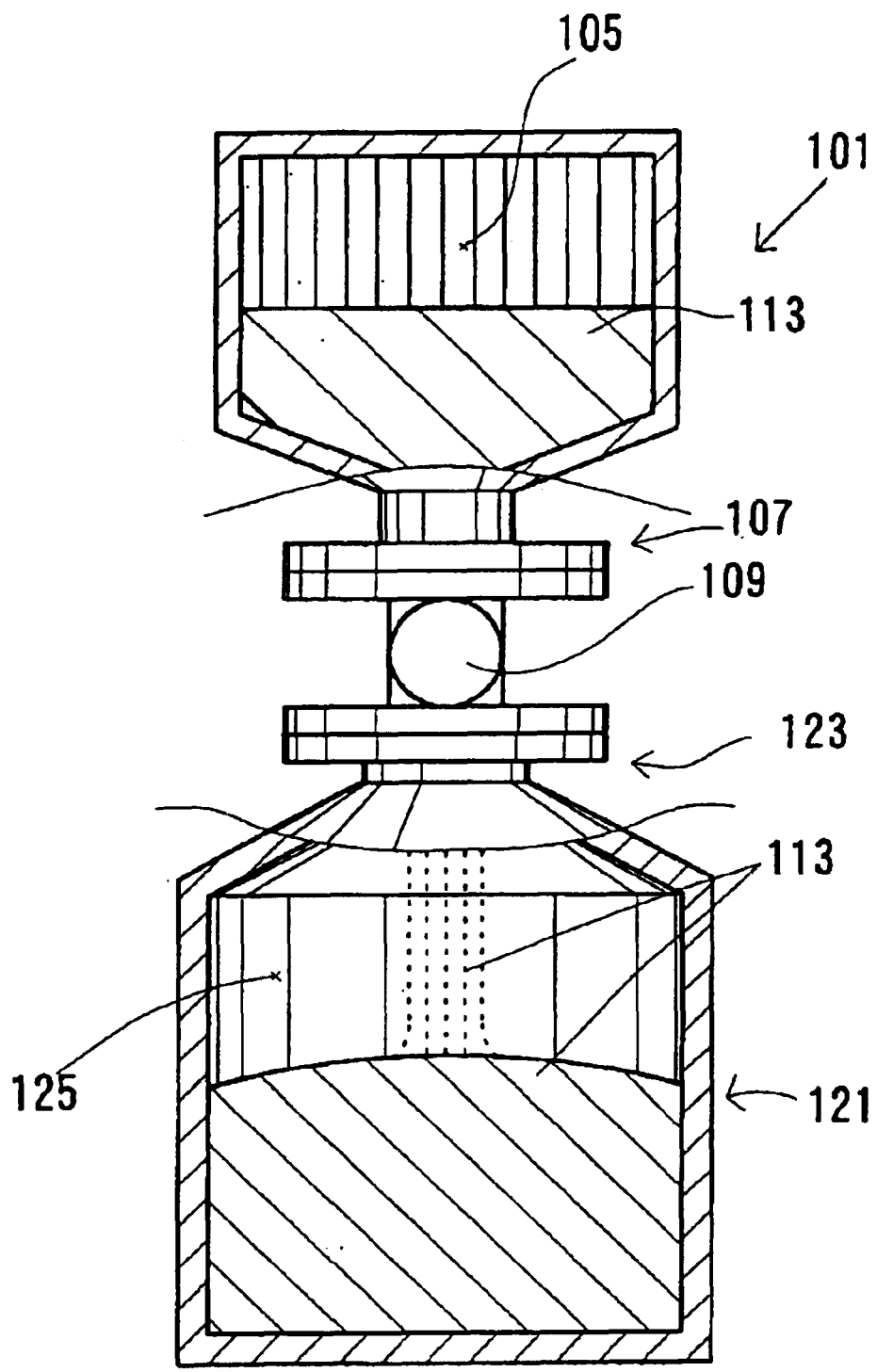
FIG. 4 is a cross-sectional view showing the MH powder being transferred from the activation vessel into the hydrogen storage tank.

The hydrogen storage tank 121 is shown in further detail in FIG. 4 and may also be referred to as a "hydrogen-absorbing alloy tank." The hydrogen storage tank 121 may include an interior 125 and a connecting portion 123. The MH powder 113 may be introduced into the hydrogen storage tank 121 by connecting the activation vessel 101 to the hydrogen storage tank 121 and opening the ball valve 109. Thus, the MH powder 113 within the interior 105 transfers to and fills the interior 125 of the hydrogen storage tank 121. Because the interior 125 of the hydrogen storage tank 121 is in a vacuum state, the movement of the MH powder 113 into the hydrogen storage tank 121 can be quickly completed due to the suction force caused by the vacuum state within the hydrogen storage tank 121.

Figure 5:
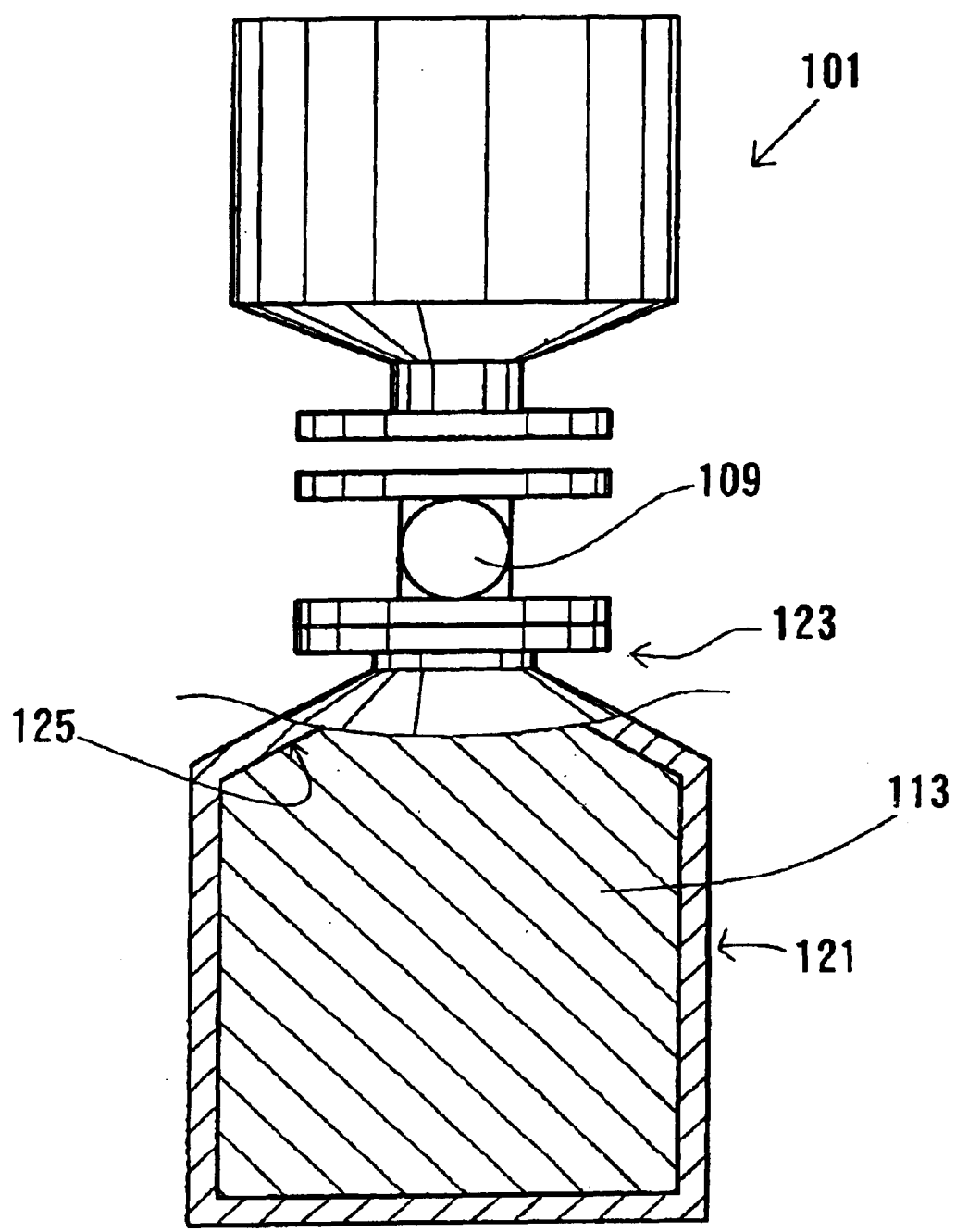
FIG. 5 is a cross-sectional view showing the hydrogen storage tank after being completely filled with MH powder.

As shown in FIG. 5, when the MH powder 113 has been completely transferred into the hydrogen storage tank 121, the ball valve 109 can be closed and the activation vessel 101 can be removed from the hydrogen storage tank 121. Thus, the MH powder 113 is prevented from communicating with the environment outside of the hydrogen storage tank 121. Further, the ball valve 109 is now attached to the hydrogen storage tank 121. That is, the disposition of the ball valve 109 changes or moves from the activation vessel 101 to the hydrogen storage tank 121.

Thus, a MH tank 121 filled with the MH powder 113 can be obtained in this representative manner. Because the MH powder 113 within the hydrogen storage tank 121 has absorbed hydrogen, the hydrogen storage tank 121 can function as a device for storing hydrogen.

As noted above, the MH powder 113 within the hydrogen storage tank 121 is first activated within the activation vessel 101. In other words, the MH powder 113 first absorbs hydrogen before being transferred into the hydrogen storage tank 121. Thus, the activation vessel 101 functions as a device designed for a preliminary activation process such that the MH powder 113 absorbs hydrogen and expands within the activation vessel 101.

Consequently, MH tank 121 only receives MH powder 113 that has already expanded within the activation vessel 101 and it is not necessary to accurately calculate the initial volume expansion of the hydrogen-absorbing alloy to be filled into the hydrogen storage tank 121. In other words, the MH powder 113 filled within the hydrogen storage tank 121 does not cause excessively high stress on the hydrogen storage tank 121. As the result, the capacity of the hydrogen storage tank 121 to store the MH powder 113 can be maximized and further, the capacity of the hydrogen storage tank 121 to store hydrogen can be maximized. In addition, the time to activate the hydrogen-absorbing alloy and to manufacture the hydrogen storage tank 121 can be minimized. Moreover, by utilizing the ball valve 109, the risk of contamination (oxidation) due to exposure of the MH powder 113 to oxygen in the air can be minimized.

The above-described representative embodiment can be modified in various ways. For example, instead of cooling MH ingot 111 and contacting MH ingot 111 with high-pressure hydrogen disposed within the activation vessel 101, hydrogen at high-pressure and low temperature may preferably be introduced into the interior 105 of the activation vessel 101. MH ingot 111 may be cooled (endothermic) by the low-temperature hydrogen so that MH ingot 111 will effectively absorb hydrogen.

According to the representative embodiment, as a preliminary step, the interior 105 of the activation vessel 101 is in a vacuum state. However, instead of the vacuum, inert gas, such as argon gas, may preferably be introduced into the interior 105 of the activation vessel 101. According to this modification, exposure of MH ingot 111 to oxygen can be minimized due to the inert gas disposed within the interior 105.

Further, although a vacuum state was formed in the hydrogen storage tank 121 in the representative embodiment, an inert gas, such as argon gas, may instead be introduced into the hydrogen storage tank 121. In addition, after a vacuum state is formed in the hydrogen storage tank 121 or after an inert gas is filled within the hydrogen storage tank 121, the activation vessel 101 may preferably be connected to the hydrogen storage tank 121. On the other hand, a vacuum may be formed in the hydrogen storage tank 121 or an inert gas may preferably be filled into the hydrogen storage tank 121 after the hydrogen storage tank 121 has been connected to the activation vessel 101.

Figure 6:
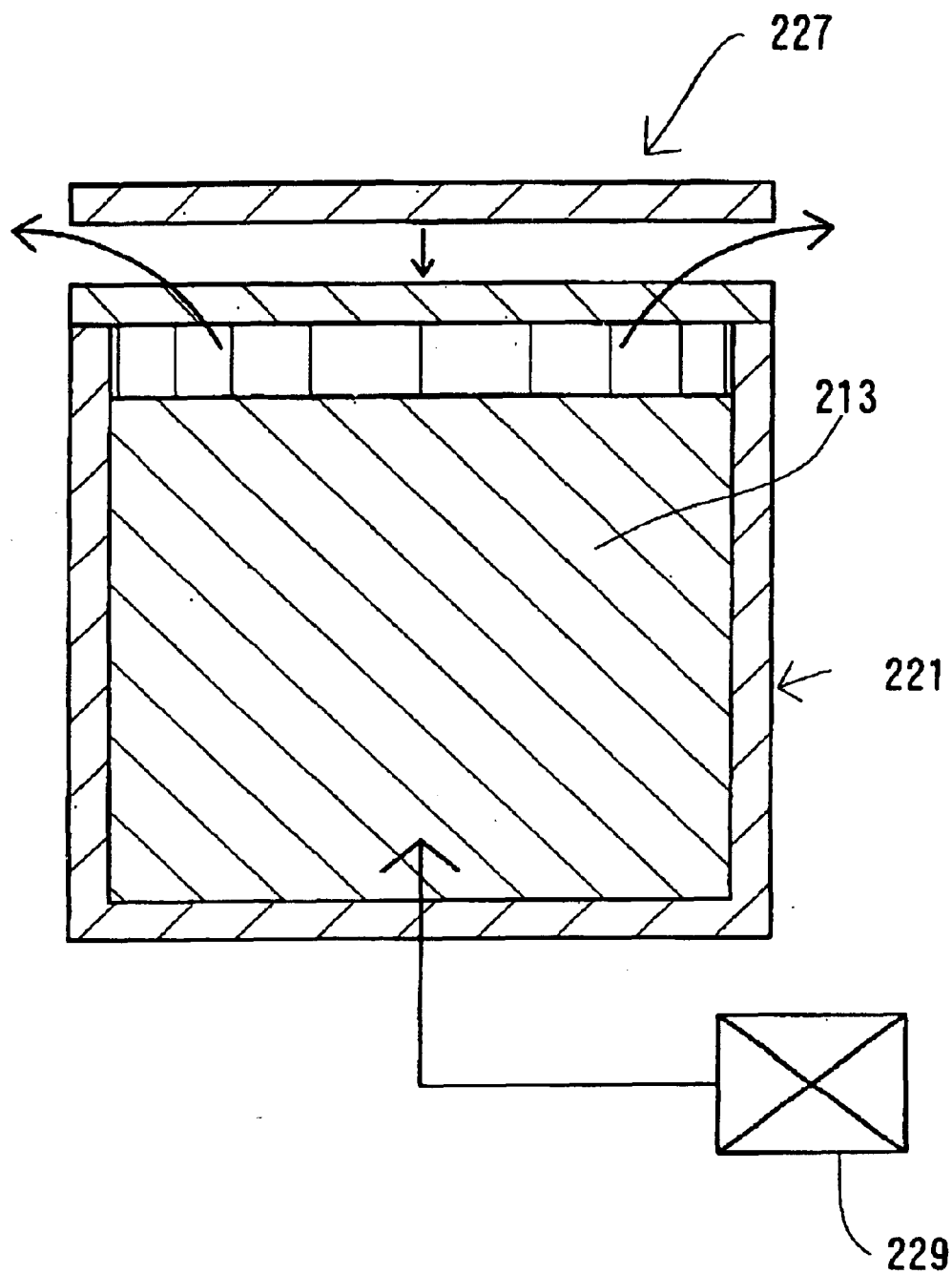
FIG. 6 shows a modification of the representative embodiment.

Further, the ball valve 109 and the connecting portion 123, which define a ceiling portion of the hydrogen storage tank 121, may preferably be removed from the hydrogen storage tank 121. Instead, as shown in FIG. 6, a flat lid 227 may preferably be attached to the top of the hydrogen storage tank 221. When the ball valve 109 is removed from the connecting portion 123, an inert gas, such as argon, may be continuously supplied to MH tank 221 from an inert gas purging device 229. That is, while purging with an inert gas, such as argon, the flat lid 227 is attached to the top of the hydrogen storage tank 221. Thus, a MH tank 221 having a flat ceiling also can be utilized.

Because inert gas is continuously supplied (purged) to the hydrogen storage tank 221 by utilizing the inert gas purging device 229 when the ball valve 109 and the connecting portion 123 are replaced with the flat lid 27, the MH powder 213 will not be exposed to oxygen in the air. Further, due to the flat ceiling structure, the hydrogen storage tank 221 can have a wide variety of installation utilities, for example, to install the MH tank 221 in a fuel cell vehicle.

What is claimed is:

1. A method comprising:
    disposing a substantially solid block of hydrogen-absorbing alloy within an activation vessel,
    introducing hydrogen gas into the activation vessel under conditions that will cause the hydrogen-absorbing alloy to absorb hydrogen and crack or break apart, thereby forming a substantially powdered hydrogen-absorbing alloy,
    connecting the activation vessel to a hydrogen storage tank via a valve disposed on the activation vessel,
    transferring the substantially powdered hydrogen-absorbing alloy from the activation vessel to the hydrogen storage tank via the valve without substantially exposing the powdered hydrogen-absorbing alloy to oxygen, and
    transferring the valve from the activation vessel to the hydrogen storage tank when the powdered hydrogen-absorbing alloy is transferred to the hydrogen storage tank from the activation vessel.

2. A method according to claim 1, wherein the hydrogen-absorbing alloy is ingot-shaped and the substantially powdered hydrogen-absorbing alloy is produced by continuously breaking the ingot-shaped hydrogen-absorbing alloy within the activation vessel due to volume expansion caused by the hydrogen-absorbing alloy absorbing hydrogen.

3. A method according to claim 1, further comprising cooling the hydrogen-absorbing alloy within the activation vessel and then introducing high-pressure hydrogen to the cooled hydrogen-absorbing alloy.

4. A method according to claim 1, wherein the valve comprises a ball valve.

5. A method according to claim 1, further comprising storing hydrogen as absorbed hydrogen within the powdered hydrogen-absorbing alloy disposed within the hydrogen storage tank.

6. A method according to claim 1, wherein the hydrogen absorbing alloy comprises titanium and vanadium and has a body centered cubic (BCC) structure.

7. A method according to claim 6, wherein the hydrogen gas contacts the hydrogen absorbing alloy at a pressure of about 0.5–10 MPa and a temperature of between about 20–60° C.

8. A method according to claim 7, further comprising:
    cooling the hydrogen-absorbing alloy within the activation vessel and then introducing relatively high-pressure and low temperature hydrogen to the cooled hydrogen-absorbing alloy, wherein the hydrogen-absorbing alloy is ingot-shaped and the substantially powdered hydrogen-absorbing alloy is produced by continuously breaking the ingot-shaped hydrogen-absorbing alloy within the activation vessel due to volume expansion caused by the hydrogen-absorbing alloy absorbing hydrogen.

9. A method according to claim 8, further comprising storing hydrogen as absorbed hydrogen within the powdered hydrogen-absorbing alloy disposed within the hydrogen storage tank.

10. A method comprising:
disposing a substantially solid block of hydrogen-absorbing alloy within an activation vessel,
introducing hydrogen gas into the activation vessel under conditions that will cause the hydrogen-absorbing alloy to absorb hydrogen and crack or break apart, thereby forming a substantially powdered hydrogen-absorbing alloy, wherein the hydrogen gas introduced into the activation vessel has a pressure of about 0.5–10 MPa and a temperature of between about 20–60° C.,
evacuating a hydrogen-storage tank, and
transferring the substantially powdered hydrogen-absorbing alloy from the activation vessel to the hydrogen storage tank without substantially exposing the powdered hydrogen-absorbing alloy to oxygen.

11. A method comprising:
disposing a substantially solid block of hydrogen-absorbing alloy within an activation vessel,
introducing hydrogen gas into the activation vessel under conditions that will cause the hydrogen-absorbing alloy to absorb hydrogen and crack or break apart, thereby forming a substantially powdered hydrogen-absorbing alloy,
evacuating a hydrogen-storage tank,
transferring the substantially powdered hydrogen-absorbing alloy from the activation vessel to the hydrogen storage tank via the valve without substantially exposing the powdered hydrogen-absorbing alloy to oxygen,
affixing a flat lid to the top of the hydrogen storage tank, thereby defining a ceiling portion of the hydrogen storage tank, after the powdered hydrogen-absorbing alloy has been transferred to the hydrogen storage tank, and
continuously supplying an inert gas to the hydrogen storage tank when the flat lid is being affixed to the hydrogen storage tank.

12. A method comprising:
disposing a substantially solid block of hydrogen-absorbing alloy within an activation vessel,
introducing hydrogen gas into the activation vessel under conditions that will cause the hydrogen-absorbing alloy to absorb hydrogen and crack or break apart, thereby forming a substantially powdered hydrogen-absorbing alloy,
filling the hydrogen-storage tank with an inert gas,
transferring the substantially powdered hydrogen-absorbing alloy from the activation vessel to the hydrogen storage tank without substantially exposing the powdered hydrogen-absorbing alloy to oxygen,
affixing a flat lid to the top of the hydrogen storage tank, thereby defining a ceiling portion of the hydrogen storage tank, after the powdered hydrogen-absorbing alloy has been transferred to the hydrogen storage tank, and
continuously supplying an inert gas to the hydrogen storage tank when the flat lid is being affixed to the hydrogen storage tank.

13. A method comprising:
disposing a substantially solid block of hydrogen-absorbing alloy within an activation vessel, wherein the hydrogen absorbing alloy comprises titanium and vanadium and has a body centered cubic (BCC) structure,
introducing hydrogen gas into the activation vessel under conditions that will cause the hydrogen-absorbing alloy to absorb hydrogen and crack or break apart, thereby forming a substantially powdered hydrogen-absorbing alloy, wherein the hydrogen gas contacts the hydrogen absorbing alloy at a pressure of about 0.5–10 MPa and a temperature of between about 20–60° C.,
filling the hydrogen-storage tank with an inert gas, and
transferring the substantially powdered hydrogen-absorbing alloy from the activation vessel to the hydrogen storage tank without substantially exposing the powdered hydrogen-absorbing alloy to oxygen.

14. A method according to claim 13, further comprising:
cooling the hydrogen-absorbing alloy within the activation vessel and then introducing relatively high-pressure and low temperature hydrogen to the cooled hydrogen-absorbing alloy, wherein the hydrogen-absorbing alloy is ingot-shaped and the substantially powdered hydrogen-absorbing alloy is produced by continuously breaking the ingot-shaped hydrogen-absorbing alloy within the activation vessel due to volume expansion caused by the hydrogen-absorbing alloy absorbing hydrogen, and wherein the substantially powdered hydrogen-absorbing alloy is transferred from the activation vessel to the hydrogen storage tank by connecting the activation vessel to the hydrogen storage tank via a ball valve disposed on the activation vessel.

15. A method according to claim 14, further comprising transferring the ball valve from the activation vessel to the hydrogen storage tank when the powdered hydrogen-absorbing alloy is transferred to the hydrogen storage tank from the activation vessel.

16. A method comprising:
disposing a substantially solid block of hydrogen-absorbing alloy within an activation vessel,
introducing hydrogen gas into the activation vessel under conditions that will cause the hydrogen-absorbing alloy to absorb hydrogen and crack or break apart, thereby forming a substantially powdered hydrogen-absorbing alloy, wherein the hydrogen gas introduced into the activation vessel has a pressure of about 0.5–10 MPa and a temperature of between about 20–60° C., and
transferring the substantially powdered hydrogen-absorbing alloy from the activation vessel to the hydrogen storage tank without substantially exposing the powdered hydrogen-absorbing alloy to oxygen.

17. A method comprising:
disposing a substantially solid block of hydrogen-absorbing alloy within an activation vessel,
introducing hydrogen gas into the activation vessel under conditions that will cause the hydrogen-absorbing alloy to absorb hydrogen and crack or break apart, thereby forming a substantially powdered hydrogen-absorbing alloy,
transferring the substantially powdered hydrogen-absorbing alloy from the activation vessel to the hydrogen storage tank without substantially exposing the powdered hydrogen-absorbing alloy to oxygen, affixing a flat lid to the top of the hydrogen storage tank, thereby defining a ceiling portion of the hydrogen storage tank, after the powdered hydrogen-absorbing alloy has been transferred to the hydrogen storage tank, and continuously supplying an inert gas to the hydrogen storage tank when the flat lid is being affixed to the hydrogen storage tank.

* * * * *